United States Patent

Tkac et al.

[11] 4,053,006
[45] Oct. 11, 1977

[54] ARRANGEMENT FOR MULTISTAGE VACUUM MOLECULAR DISTILLING

[75] Inventors: Alexander Tkac; Jan Cvengros, both of Bratislava, Czechoslovakia

[73] Assignee: Rektorat Slovenskej vysokej skoly technickej, Bratislava, Czechoslovakia

[21] Appl. No.: 627,551

[22] Filed: Oct. 31, 1975

[30] Foreign Application Priority Data

Apr. 10, 1974 Czechoslovakia .................. 2573/74

[51] Int. Cl.² ............................................. B01D 1/22
[52] U.S. Cl. .................. 159/6 W; 202/205; 202/236
[58] Field of Search .............. 159/6 W, 13 R, 15; 122/39; 165/118; 202/236, 205; 196/128; 203/89

[56] References Cited

U.S. PATENT DOCUMENTS

| 2,855,345 | 10/1958 | Mares | 202/236 |
| 2,890,155 | 6/1959 | Bueche | 202/236 |
| 3,292,683 | 12/1966 | Buchi | 202/236 |
| 3,434,935 | 3/1969 | Habendorff | 202/236 |

FOREIGN PATENT DOCUMENTS

| 154,171 | 6/1974 | Czechoslovakia | |
| 88,183 | 1959 | Czechoslovakia | |
| 90,376 | 1959 | Czechoslovakia | |
| 114,714 | 5/1965 | Czechoslovakia | |
| 114,756 | 5/1965 | Czechoslovakia | |
| 127,649 | 5/1968 | Czechoslovakia | |
| 129,533 | 10/1968 | Czechoslovakia | |
| 134,822 | 1/1970 | Czechoslovakia | |
| 135,247 | 2/1970 | Czechoslovakia | |
| 4,226,175 | 12/1967 | Japan | 159/6 W |

Primary Examiner—Hiram H. Bernstein

[57] ABSTRACT

An arrangement for multistage vacuum and molecular distilling with a wiped off film using a single evaporator body common for different vacuum stages, with rotating vacuum seals between adjacent vacuum stages provided with a common drive.

6 Claims, 5 Drawing Figures

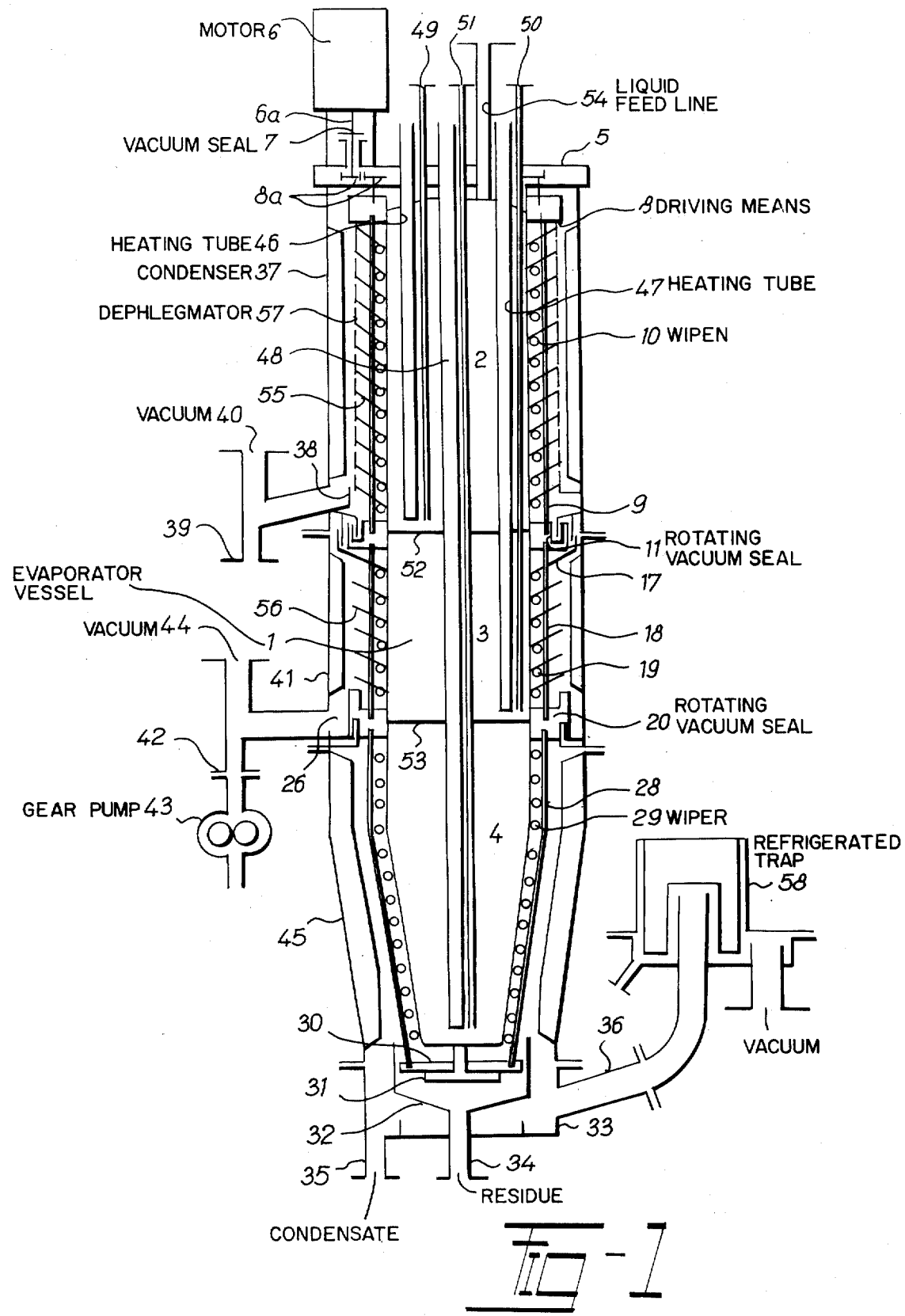

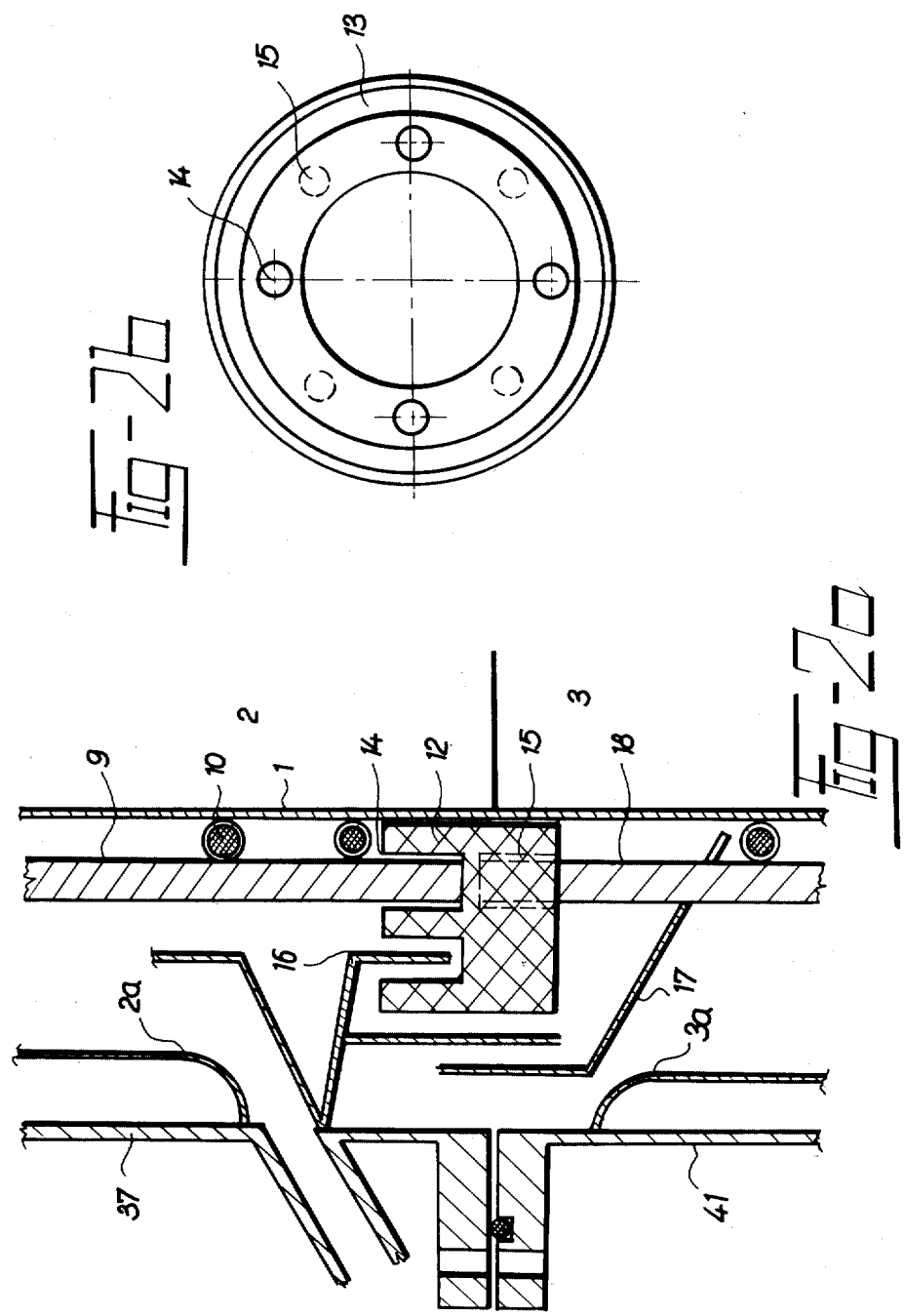

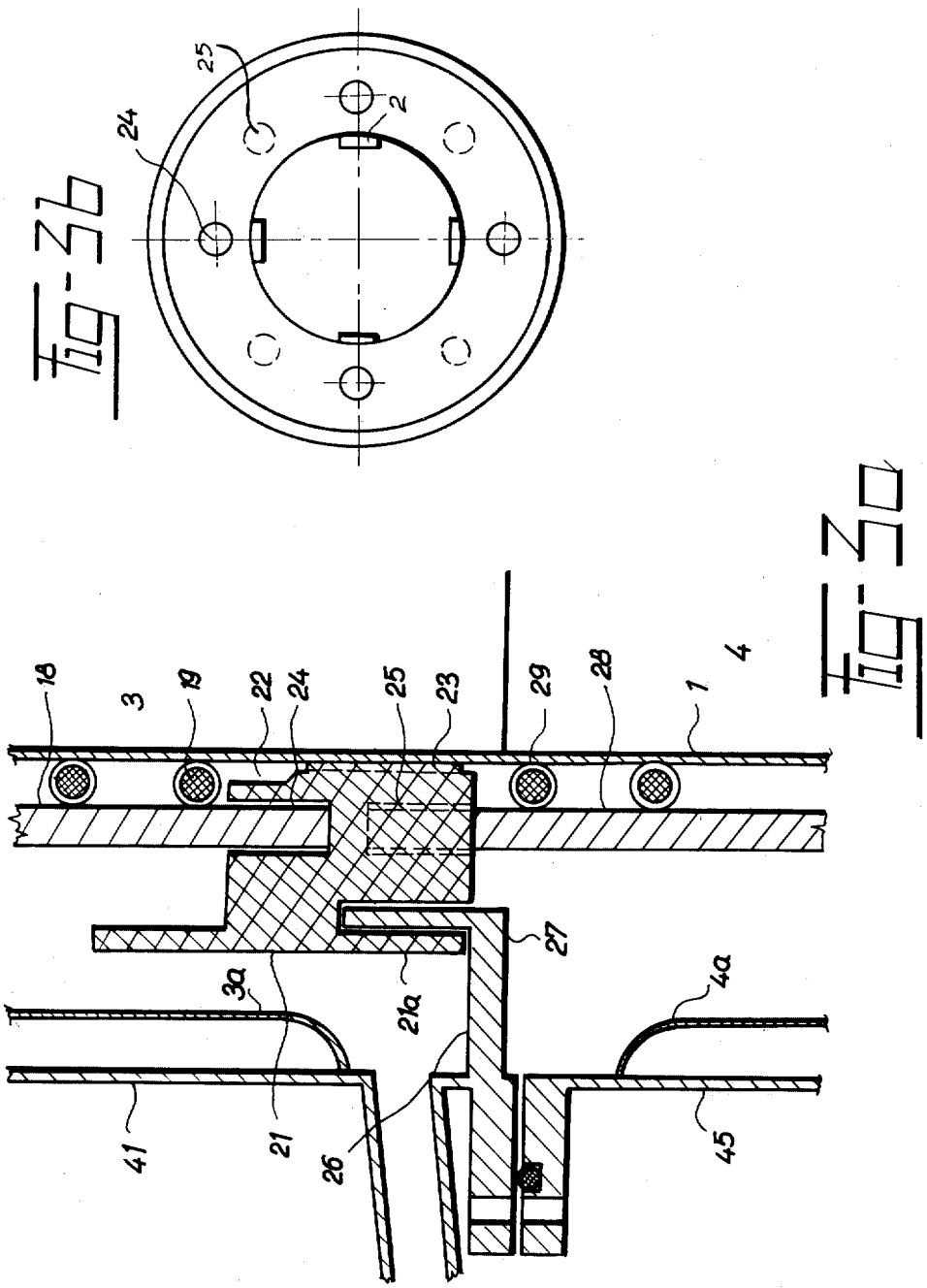

ARRANGEMENT FOR MULTISTAGE VACUUM MOLECULAR DISTILLING

BACKGROUND OF THE INVENTION

The invention relates to an arrangement for multistage vacuum and molecular distilling or evaporating liquid in the form of a wiped off film. Such arrangements generally have a single evaporator body wherein there are individual working spaces provided with different vacuum pressures, adapted for degasing the treated liquid at a pressure of about $10^{-1}$ Torr, for preheating the liquid at a pressure of about $10^{-2}$ Torr and for molecular distilling it at a pressure of the order of $10^{-3}$ Torr. These individual working spaces are disposed within a single evaporator vessel and are separated from each other solely by rotating vacuum seals mounted between the evaporator vessel and the cooling cover so that the treated liquid passes from the working space with the lower vacuum to the working space with the higher vacuum and the rotating vacuum seals form together with the wipers in the individual working vacuum spaces a single unit.

In all of the now known arrangements for continuous vacuum and molecular distilling or evaporating liquid obtained in the form of a wiped off film, whether based on the principle of vertical cylindrical evaporator bodies (such as described, for example, in Czechoslovak Pat. Nos. 90,376 and 88,183, French Pat. No. 1,194,059, Czechoslovak Pat. Nos. 90,917, 114,756 and 114,714) or of evaporator bodies with vertical arrangement tapered in the direction of the trickling wiped off film (such as described, for example, in Czechoslovak Pat. No. 134,822) or of evaporator bodies having a combination of a cylinder and cone (such as described, for example, in Czechoslovak Pat. No. 134,822) or by using centrifuges (such as described, for example, in Czechoslovak Pat. Nos. 82,845 and 82,844, German published patent applications Nos. 1,080,972 and 1,014,971, French Pat. No. 1,025,087), the distilled liquid is gradually deprived of volatile materials in an individual evaporating stage, it is preheated in an equalizing vacuum stage and vacuum distilled in an individual high vacuum stage, whereby individual parts of the arrangement are, in case of a vertical arrangement connected, by means of double siphon seals (such as described, for example, in Czechoslovak Pat. No. 129,533) or in case of a horizontal arrangement by means of a system of vacuum dosing pumps. There is also known an arrangement for vacuum and molecular distilling liquid obtained from a wiped off film (such as described, for example, in Czechoslovak Pat. No. 154,171) wherein the agitation of the wiping off device in the individual working parts of the evaporator is effected by means of a single central shaft having a single vacuum seal in the part of the arrangement having the lowest vacuum. This arrangement is however provided with at least three individual wiping off systems, operating on three evaporator bodies. Therefore, the individual stages of the arrangement having a different vacuum are mutually connected by heated rotating siphon seals. A drawback of all of the described vacuum and molecular evaporators of the prior art resides in that they are composed of too many parts, and require a large number of vacuum sealed cooled flanges, a large number of auxiliary heating covers with individual temperature controls. It is therefore rather difficult to prevent mixing of the liquid passing through the device and the device generally gradually clogs due to decayed products which do not pass through. Such arrangements need individual wiping off systems in the individual parts with vacuum sealed mechanical transmission which require lubrication, so that the whole arrangement becomes rather complex and the assembling of it requires larger manipulation spaces. In the case of a vertical arrangement the siphon seals between the individual parts increase the overall height of the arrangement. In the case of a horizontal arrangement the pumps, which generally are gear wheel pumps, mounted between individual stages can be sources of frequent breakdowns, such as loss of vacuum, clogging, failure of operation due to mechanical dirt and similar malfunctioning.

SUMMARY OF THE INVENTION

It is an object of this invention to eliminate these drawbacks and to provide an arrangement of the aforedescribed type which requires only a single evaporator body. In the arrangement of the invention the liquid can pass freely from one vacuum stage to the next one without complicated connecting means and without heat losses. The arrangement of the invention has at least one, but generally two, rotating vacuum seals, which are arranged coaxially in a single evaporator vessel of cylindrical or conical shape or having a combination of both said shapes. These rotating vacuum seals separate tightly two adjacent working spaces with different vacuum (a lower vacuum stage and an equalizing stage and/or an equalizing stage and a higher vacuum stage) situated between the evaporator body and a cooling jacket so that the evaporated material flows continually on the surface of the evaporator body from the working space with the lower vacuum to the working space with the higher vacuum, whereby the descending film is guided so as to form itself a liquid vacuum seal. In the arrangement according to this invention the rotating vacuum seals form a part of the wiping off device by mutually connecting the lower entraining means of the wiper by way of entraining rods of the wiper of the higher vacuum stage with the rotating vacuum seal between the equalizing and higher vacuum stage. The rotating vacuum seal is furthermore connected by means of entraining rods of the wiper of the equalizing vacuum stage to the rotating vacuum seal disposed between the lower and equalizing vacuum stage, and the latter seal is furthermore connected by means of entraining rods of the wiper of the lower vacuum stage with the upper entraining means of the wiper. A rotary movement is transmitted from some suitable driving means so that the whole wiping off device is driven as a unit. The wipers of the individual stages consist of a system of segments of an endless coil, mounted in protective teflon tubes. The single evaporator vessel according to this invention is arranged within a system of sequentially interconnected cooling jackets having a duplicator and the cooling jacket is subdivided by partition walls into individually heated spaces.

The use of a single evaporator vessel having rotating vacuum seals as integral parts of the wiping off device has, in addition to constituting a substantial simplification of the mechanical designs of all prior art multistage film vacuum and molecular evaporators, a number of further advantages, while all known principles necessary for a maximum distilling capacity per unit of evaporator surface and high separating efficiency may still be maintained. Connecting elements between individual vacuum stages are eliminated and the liquid passes directly from one vacuum stage to the next one practically without heat losses, securing thus high thermal efficiency. The thermal efficiency is also improved by elimination of two covers, which are necessary for individual vacuum stages and which are sources of high heat losses. By virtue of the elimination of connecting elements between vacuum stages, such as heated siphons, or a pump for repumping, which cause frequent breakdowns, the reliability in operation of the arrangement is improved and the time of contact of thermally unstable material with heated surfaces is reduced. Furthermore, the possibility of contamination by traces of air oxygen, sucked in at flange connections and bearings, is reduced. The arrangement according to this invention achieves a maximum efficiency, from the point of view of vacuum, because only a relatively small space located between the single evaporator vessel and a system of cooling jackets is evacuated. Vacuum seals for the drive of the wiping off devices in the equalizing vacuum stage and in the higher vacuum stage are not required. The only vacuum seal for the shaft of the wiping off device is situated at the lower vacuum stage having the lowest vacuum. The technical solution of the arrangement according to this invention makes it possible, due to its simplicity of shape and assembly, to easily maintain it, as the film flowing along the heated surface is always wiped off and the danger of stationary or slowly moving material adhering to surfaces being burnt is eliminated. The arrangement according to this invention required a minimum space for assembling. The same useful evaporator surface is obtained with smaller overall dimensions than comparable arrangements having connecting elements between vacuum stages. It is simpler in manufacture and cheaper to construct than comparable prior art arrangements. The arrangement according to this invention permits the adjustment of the height of individual vacuum stages according to special requirements of industrial manufacture. It makes possible the tapping of further fractions from separated condensor surfaces at different heights of individual vacuum stages. It makes possible a recycling of the material and a distilling in the following stage of the condensate from the preceding stage. The arrangement makes possible a multistage distilling at equal temperature in the whole evaporator body utilizing the gradually increasing vacuum in the individual stages. In the latter case it is not necessary to divide the inside of the evaporator vessel into individually heated spaces. Consequently, it is possible for the evaporator vessel to have any suitable shape, such as a cylinder, cone or their combination, and possibly even a system of cylinders having gradually smaller diameters. The arrangement of the invention makes possible the application of known technical elements which are advantageous for a continuous molecular distilling, particularly a wiping device (see, for example, Czechoslovak Pat. No. 114,714 and Czechoslovak Pat. No. 114,756 wherein a system of condenser surfaces for improvement of the separating efficiency and prevention of overspraying is described, and Czechoslovak Pat. No. 135,247 wherein the application of a sieve as a partial condenser in the space between the evaporating and condenser surface is described, and Czechoslovak Pat. No. 127,649 wherein a method of heating of evaporator vessels is described, and Czechoslovak Pat. No. 134,822 wherein a combination of a cylindrical and conical evaporator surface is described, and Czechoslovak Pat. No. 154,171 wherein a single drive of the wiping off device is described.)

BRIEF DESCRIPTION OF THE DRAWING

The above mentioned as well as numerous other features and advantages of the arrangement of the present invention will become further apparent from the following detailed description thereof, which is to be read with reference to the accompanying drawings in which:

FIG. 1 is a schematical sectional elevation of a three stage arrangement for vacuum and molecular distilling with wiped off film having a single evaporator vessel;

FIG. 2a is a partial schematically illustrated sectional view of a first embodiment of rotating vacuum seals;

FIG. 2b is a schematically illustrated top view of the disk of the vacuum seal of FIG. 2a indicating the position of the entraining rods;

FIG. 3a is a partial schematically illustrated sectional view of a second embodiment of rotating vacuum seals;

FIG. 3b is a schematically illustrated top view of the disk of the vacuum seal of FIG. 3a indicating the position of the entraining rods.

DESCRIPTION OF PREFERRED EMBODIMENTS

With reference to FIG. 1 there are illustrated two rotating vacuum seals which form a three stage arrangement. In the illustrated arrangement a first embodiment of the rotating vacuum seal is used in the upper portion of the arrangement and a second embodiment of the rotating vacuum seal is used in the lower portion of the arrangement. It is understood that these alternatives need not be used simultaneously and at the indicated places.

The main part of the arrangement according to this invention, as shown in FIG. 1, is the evaporator vessel 1, which has a convex outer surface of cylindrical and/or frusto-conical shape and which is suspended from a cover 5. A drive mechanism 6 rotates a wiping off device. The driving is accomplished by means of a motor 6, the shaft 6a of which is sealed by a vacuum seal 7. The shaft 6a drives via gearing means 8a the upper driving means 8 of the wiping off device. Entraining rods 9 are mounted in the driving means 8 and form the wiper for the lower vacuum stage 2. The entraining rods 9 support a system of segments of an endless coil 10 of teflon tubing of the lower vacuum stage 2. The entraining rods 9 of the wiper of the lower vacuum stage 2 engage at their lower free ends with the rotating vacuum seal 11 disposed between the lower vacuum stage 2 and the equalizing vacuum stage 3, which rotating vacuum seal 11 separates the lower vacuum stage 2 with a vacuum of the order $10^{-1}$ Torr from the equalizing vacuum stage 3 with a vacuum of the order $10^{-2}$ Torr. The liquid flowing down along the heating surface of the evaporator body 1 in the lower vacuum stage 2 is, after passage through the rotating vacuum seal 11, between the lower vacuum stage 2 and the equalizing vacuum stage 3, returned to the heating surface of the evaporator body 1 in the equalizing vacuum stage 3 by means of a supply funnel 17, supported on the entraining rods 18 of the equalizing vacuum stage 3. These entraining rods 18 of the equalizing vacuum stage 3 also support a system of segments of an endless coil 19 for the equalizing vacuum stage 3. The entraining rods 18 engage into the rotating vacuum seal 20, disposed between the equalizing vacuum stage 3 and the higher vacuum stage 4 and the seal 20 separates the equalizing vacuum stage 3 with a vacuum of the order $10^{-2}$ Torr from the higher vacuum stage 4 with a vacuum of the order $10^{-3}$ Torr. The distilled liquid on the heating surface in the higher vacuum stage 4 is mixed and wiped off by a system of segments of an endless coil 29 made of teflon tubing which are fixed on entraining rods 28 of the wiper of the higher vacuum stage 4. The entraining rods 28 are inserted at the top into the rotating vacuum seal 20 situated between the equalizing vacuum stage 3 and the higher vacuum stage 4 and at the bottom into the lower driving means 30, supported on a bearing 31, fixed to the lower part of the evaporator vessel 1. The distilling residue is removed by way of a collecting funnel 32 having a tube 34 connected to a pump (non-illustrated) for removal of this residue. In the lower part 33 of the arrangement there is furthermore provided a tube 36 for removal of the distillation product from the higher vacuum stage 4 and a neck 35 for the higher vacuum. The condensate from the lower vacuum stage 2 is collected on the cooling jacket 37 with a double wall 2a (FIG. 2a) of the lower vacuum stage 2 and taken off by way of trough 38 and a tube 39 for removal of this condensate of the lower vacuum stage 2 by a non-illustrated pump. The lower vacuum stage 2 is connected to the source of vacuum by way of a connecting piece 40. The condensate from the equalizing vacuum stage 3 is collected on the cooling jacket 41 with a double wall 3a of the equalizing stage 3 and is removed by means of a tube 42 connected to a non-illustrated pump 43 for removal of distilling products of the equalizing vacuum stage 3. The connecting piece 44 serves for connection of the equalizing vacuum stage 3 to the source of vacuum. The condensate from the higher vacuum stage 4 is collected on the cooling jacket 45 with a double wall 4a of the higher vacuum stage 4 and taken off by way of a tube 35 for removal of the distilled products. The evaporator vessel 1 is divided inside by a partition wall 52 between the heating space of the lower vacuum stage 2 and the equalizing vacuum stage 3. This partition wall can be simple or double. A partition wall 53 is disposed between the heating space of the equalizing vacuum stage 3 and the higher vacuum stage 4 to separate these heating spaces. The heating space of the lower vacuum stage 2 is heated by pressure steam, whereby the respective heat transmitting medium water, steam or the like is electrically heated by a resistance coil mounted in a tube 46 for heating the lower vacuum stage 2. A contact manometer (not illustrated) maintains the temperature in this heating space. This manometer is connected to a tube 49, of a pressure regulator for the lower vacuum stage 2. The heating of the equalizing vacuum stage 3 is accomplished similarly. The heat transmitting medium is thereby heated by a coil mounted in a tube 47 for heating the equalizing vacuum stage 3 and a pressure regulator is connected to the coacting tube 50 for this regulator of the equalizing vacuum stage 3. Similarly the heat transmitting medium in the higher vacuum stage 4 is heated by a coil mounted in a tube 48 having a pressure regulator connected to a tube 51. The treated liquid is supplied to the arrangement by means of an injection pipe 54. A system of condenser surfaces 55 of the lower vacuum stage 2 is supported on the entraining rods 9 of the lower vacuum stage 2 in order to prevent any overspraying. A dephlegmator 57 is thus formed to prevent any micro-overspraying and to improve the separating efficiency of this stage. A system of condenser surfaces is also supported on the entraining rods 18 of the equalizing vacuum stage 3. An effective cooler 58 forms a part of the vacuum system of the higher vacuum stage 4 and protects from contamination the contents of a diffusor vacuum pump and of the rotating oil pump. Similar coolers are provided also for the vacuum system of the lower vacuum stage and for the equalizing vacuum stage.

FIGS. 2a and 2b show in detail a first embodiment of a rotating liquid vacuum seal as used in FIG. 1 wherein it is designated as the rotating vacuum seal 11 disposed between the lower vacuum stage 2 and the equalizing vacuum stage 3. The entraining rods 9 of the wiper of the lower vacuum stage 2 engage into upper bores 14 of a closing ring 12, relatively tightly fitted to the evaporator vessel 1, which closing ring 12 is part of the rotating vacuum seal 11 between the lower vacuum stage 2 and the equalizing vacuum stage 3. The liquid flowing down along the heating surface of the evaporator vessel 1 passes over the overflow trough 13, into which a stable separator 16 is extending which separator is fixed vacuum tightly on the cooling jacket 37 with a double wall for the lower vacuum stage 2. The thus formed liquid seal separates the lower vacuum stage 2 from the equalizing vacuum stage 3. A supply funnel 17 supplies the treated liquid to the heating surface of the evaporator vessel in the equalizing vacuum stage 3. This supply funnel 17 is fixed to entraining rods 18 of the wiper of the equalizing vacuum stage 3 and these rods 18 engage into the lower bores 15 of the rotating vacuum seal 11 disposed between the lower vacuum stage 2 and the equalizing vacuum stage 3.

FIGS. 3a and 3b illustrate in detail a second embodiment of a rotating vacuum seal, applied in FIG. 1 to the location of the rotating vacuum seal 20 disposed between the equalizing vacuum stage 3 and the higher vacuum stage 4. The entraining rods 18 of the wiper of the equalizing stage 3 engage into the openings 24 of the closing ring 21 which is a part of the rotating vacuum seal 20 disposed between the equalizing vacuum stage 3 and the higher vacuum stage 4. The liquid flowing along the heating surface of the equalizing vacuum stage 3 enters the equalizing trough 22 which is filled thereby and overflows continuously in the space between the limiting pins 23 and the evaporator vessel 1 into the higher vacuum stage 4. The dimensions of the gap between the evaporator vessel 1 and the closing ring 21 are advantageously selected so, that a stable liquid column is created, which acts as a liquid seal between two vacuum stages. An extension 21a of the closing ring 21 engages into the condensate collected in the collecting trough 26 and seals vacuum tightly the equalizing vacuum stage 3 from the higher vacuum stage 4. Entraining rods 28 of the wiper of the higher vacuum stage 4, having a system of segments of an endless coil 29 of the higher vacuum stage 4 extend into lower entraining bores 25 of the closing ring 21.

The arrangement according to this invention can find its application in laboratories, in pilot plants and in normal manufacture either as an independent unit or as a battery composed of several units. It has a wide application in the chemical industry. For instance, it can be used for softening agents, detergents, antioxydants, epoxide resins, naphten acids, chlorinated diphenyls, sugar beet fractions, impregnating agents, vacuum oils, esters, oligomers and low polymers. It can be used in the food stuff industry as emulgators, monoglycerides, sugar esters, vegetable oils. It can be used in the pharmaceutic industry as vitamines, triglycerides, semiproducts and final products of the synthesis of medicines and biologically active materials.

The arrangement according to this invention can be applied also as a continuous film reactor, operating either at atmospheric pressure or at a vacuum, what is particularly advantageous for reactions, where the continuous removal of reaction products prevents their heat deterioration, whereby the shifting of the equilibrium improves the yield of the reaction. Reactions proceeding on thin wiped off films are heat controlled at an optimum degree. The application of the arrangement as film reactor in combination with a following or simultaneous vacuum distilling is particularly advantageous.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In an arrangement for establishing a multi-stage vacuum and molecular distillation process using a wiped-off film, an elongated, vertically disposed evaporator vessel supported for rotation about a first longitudinal axis thereof and having a convex outer surface; means including condenser means surrounding first, second and third successively lower regions of the convex outer surface of the evaporator vessel to define therebetween first, second and third vacuum distillation stages; first and second annular elements individually affixed to the outer surface of the evaporator element to define interfaces between the first and second vacuum stages and the second and third vacuum stages, respectively; first, second and third elongated wiping means extending longitudinally along the outer surface of the evaporator means in the respective first, second and third vacuum stages, the first, second and third wiping means respectively including first, second and third entraining rods, the first and second rods having respective lower and upper ends secured to the first annular element, the second and third rods having respective lower and upper ends secured to the second annular element, whereby the evaporator vessel, the annular elements and the entraining means form a unitary first assembly rotatable about the first axis; means disposed in each of the first and second annular elements for effecting a controlled flow of a fluid therethrough from the lower end of the next-higher vacuum stage to the upper end of the next-lower vacuum stage so that the controlled flow of such fluid during a rotation of the first assembly about the first axis provides a rotary vacuum seal between the associated vacuum stages; means for introducing a first liquid to be distilled to the upper end of the first wiping means to be entrained thereby, whereby portions of the first liquid flow downwardly and alternately through the entraining rods and the effecting means of the annular elements; means for rotating the first assembly about the first axis so that the controlled movement of the first liquid through the effecting means of the annular elements provides liquid rotary vacuum seals among the first, second and third vacuum stages; and means coupled to the condensing means for individually evacuating the first, second and third vacuum stages to successively higher degrees.

2. The arrangement as set forth in claim 1, in which the condenser means comprises a plurality of double-walled cooling jackets individually associated with the first, second and third regions of the outer surface of the evaporator vessel, and in which the arrangement further comprises heating means operatively mounted in the interior of the evaporator vessel.

3. The arrangement as set forth in claim 1, wherein said evaporator vessel has a cylindrical shape.

4. The arrangement as set forth in claim 1, wherein said evaporator vessel has a frusto-conical shape.

5. The arrangement as set forth in claim 1, wherein said evaporator vessel has a combination of a cylindrical and frusto-conical shape.

6. The arrangement as set forth in claim 1, in which the wiping means further comprises a plurality of tubular coil segments individually extending downwardly along and affixed to respective ones of the entraining rods.

* * * * *